(12) United States Patent
Stöhrmann

(10) Patent No.: US 11,738,480 B2
(45) Date of Patent: Aug. 29, 2023

(54) VALVE CONTROL METHOD AND DEVICE

(71) Applicant: HARBURG-FREUDENBERGER MASCHINENBAU GMBH, Hamburg (DE)

(72) Inventor: Andreas Stöhrmann, St. Peter-Ording (DE)

(73) Assignee: HARBURG-FREUDENBERGER MASCHINENBAU GMBH, Hamburg (DE)

(*) Notice: Subject to any disclaimer, the term of this patent is extended or adjusted under 35 U.S.C. 154(b) by 454 days.

(21) Appl. No.: 16/969,059

(22) PCT Filed: Feb. 12, 2019

(86) PCT No.: PCT/DE2019/000033
§ 371 (c)(1),
(2) Date: Aug. 11, 2020

(87) PCT Pub. No.: WO2019/154452
PCT Pub. Date: Aug. 15, 2019

(65) Prior Publication Data
US 2021/0031412 A1    Feb. 4, 2021

(30) Foreign Application Priority Data
Feb. 12, 2018 (DE) .................... 10 2018 001 132

(51) Int. Cl.
*B29C 35/00* (2006.01)
*B29C 35/04* (2006.01)
(Continued)

(52) U.S. Cl.
CPC ........ *B29C 35/007* (2013.01); *B29C 35/0294* (2013.01); *B29C 35/04* (2013.01);
(Continued)

(58) Field of Classification Search
CPC ..... B29C 35/007; B29C 35/04; B29C 35/049; B29C 35/0294; B29D 2030/0667;
(Continued)

(56) References Cited

U.S. PATENT DOCUMENTS

2012/0301565 A1    11/2012    Tanaka

FOREIGN PATENT DOCUMENTS

DE    3308138 A1    9/1984
DE    202013101969 U1    7/2014
(Continued)

OTHER PUBLICATIONS

Translation of KR-100245521-B1 (Year: 2000).*
Translation of JP-5105704-B2 (Year: 2012).*

*Primary Examiner* — Xiao S Zhao
*Assistant Examiner* — John J DeRusso
(74) *Attorney, Agent, or Firm* — LUCAS & MERCANTI, LLP; Klaus P. Stoffel

(57) ABSTRACT

A method and the device are used to control valves. The valves are arranged in the region of lines for a fluid. At least one first valve is in the form of a control valve arranged in the region of a primary line. At least one second valve is in the form of a switching valve. At least one branch is arranged downstream of the control valve in the region of a direction of flow. At least two secondary lines extend downstream of the branch. Each secondary line has one of the switching valves. The valves are connected to a control unit which coordinates the function of the valves.

11 Claims, 2 Drawing Sheets

(51) Int. Cl.
  *B29D 30/06* (2006.01)
  *B29C 35/02* (2006.01)
(52) U.S. Cl.
  CPC .. *B29D 30/0662* (2013.01); *B29D 2030/0667* (2013.01); *B29D 2030/0677* (2013.01)
(58) Field of Classification Search
  CPC ...... B29D 2030/067; B29D 2030/0671; B29D 2030/0673; B29D 30/0662; B29D 2030/0677; B29D 2030/0675
  See application file for complete search history.

(56) References Cited

FOREIGN PATENT DOCUMENTS

| | | | |
|---|---|---|---|
| EP | 2535173 | A1 | 12/2012 |
| JP | 5105704 | B2 * | 12/2012 |
| KR | 100245521 | B1 * | 2/2000 |
| KR | 20040042132 | A | 5/2004 |
| WO | 2009031493 | A1 | 3/2009 |

\* cited by examiner

VALVE CONTROL METHOD AND DEVICE

CROSS-REFERENCE TO RELATED APPLICATIONS

The present application is a 371 of International application PCT/DE2019/000033, filed Feb. 12, 2019, which claims priority of DE 10 2018 001 132.2, filed Feb. 12, 2018, the priority of these applications is hereby claimed and these applications are incorporated herein by reference.

BACKGROUND OF THE INVENTION

The invention relates to a method for controlling valves which are arranged in the region of lines for a fluid, wherein at least one first valve is in the form of a switching valve arranged in the region of a primary line, and wherein at least one second valve is in the form of a closed-loop control valve.

The invention also relates to a device for controlling valves which are arranged in the region of lines for a fluid, wherein at least one first valve is in the form of a switching valve arranged in the region of a primary line, and wherein at least one second valve is in the form of a closed-loop control valve.

The invention also relates to a heating press which, in order to heat components or assemblies, has a device for controlling valves.

Corresponding methods and devices for controlling valves are used in different technical installations. For example, applications both in the field of pneumatic systems and in the field of hydraulic systems are known.

Closed-loop control valves are often used to supply a predefinable amount of the fluid and/or to supply the fluid with a predefinable pressure. The use of such closed-loop control valves results in relatively high costs, in particular in the case of complex and branched line systems.

The number of closed-loop control circuits using a closed-loop control valve for each installation is often disproportionately reduced for investment reasons and it is necessary to combine closed-loop control circuits. This circumstance brings the installation manufacturers again and again into the situation in which temperature accuracies may be required but cannot be guaranteed.

SUMMARY OF THE INVENTION

The object of the present invention is to improve a method of the type mentioned in the introduction in such a manner that the resulting costs are reduced.

A further object of the present invention is to construct a device of the type mentioned in the introduction in such a manner that a reduced manufacturing effort and reduced manufacturing costs are achieved.

A valve control device according to the invention has at least one control unit which can be used to actuate a plurality of valves.

In different embodiments of the invention, the valves can be actuated electrically and/or pneumatically and/or hydraulically with the aid of the at least one control unit.

Furthermore, in one embodiment, a valve control device according to the invention has at least three valves.

In one embodiment according to the invention, at least two valves assigned to closed-loop control circuits can be controlled with the aid of the valve control device, wherein the closed-loop control circuits are each coupled to a central supply device of a fluid via at least one primary line or a main channel. At least one switching valve or control valve is respectively arranged in the region of the primary lines, the binary states "open" and "closed" of which can be adjusted with the aid of the control unit, with the result that a supply of the fluid to a closed-loop control circuit can be switched on or off via the respective primary line(s).

The fluid is, for example, a heat-conducting fluid in the form of saturated steam, superheated steam, water, oil, gas, white water or a mixture thereof. In this case, the closed-loop control circuits are provided by heating circuits.

However, according to the invention, other applications, for example cooling circuits, are also conceivable as closed-loop control circuits, wherein the fluid has corresponding properties, for example those of a refrigerant.

In one embodiment according to the invention of a valve control device, valves in secondary lines or additional channels can also be actuated. The secondary lines or additional channels each open into a primary line connected to a closed-loop control circuit at a summation point.

In one embodiment of the invention, those ends of the secondary line which do not open into the primary lines are connected to one another. At least one secondary supply line which is connected to the central supply device of a fluid is connected to this connection point.

In one embodiment of the invention, at least one valve which is preferably in the form of a switching valve is respectively arranged in the region of the secondary lines.

In one embodiment of the invention, at least one valve which is in the form of a switching valve or a closed-loop control valve is arranged in the region of the secondary supply line.

In one preferred embodiment of the invention, at least one of the valves or the actuatable valves is in the form of a closed-loop control valve or an adjusting valve, the degree of opening of which can be adjusted with the aid of the control unit.

In one particularly preferred embodiment of the invention, the at least one valve arranged in the region of the at least one secondary supply line is in the form of a closed-loop control valve, with the result that the volumetric flow of the fluid flowing through the secondary supply line can be controlled in a closed-loop manner.

In one embodiment of the invention, the valves can be actuated in such a manner that an additional volumetric flow of the fluid can be supplied to the respective primary line via the at least one secondary line assigned to a closed-loop control circuit.

In one embodiment of the invention, the device has at least one temperature sensor.

In one preferred embodiment of the invention, at least one sensor is assigned to each closed-loop control circuit.

In the case of closed-loop temperature control of closed-loop control circuits in the form of heating circuits or cooling circuits, at least one sensor assigned to a closed-loop control circuit is in the form of a temperature sensor.

In one preferred embodiment of the invention, the measured value from the at least one sensor assigned to a closed-loop control circuit can be read and the determined measured values can be evaluated in order to control the valves assigned to the respective closed-loop control circuit.

In one particularly preferred embodiment of the invention, it has a closed-loop controller which can be used to control the temperature in at least one closed-loop control circuit in a closed-loop manner by virtue of the measured values read from the at least one temperature sensor assigned to a closed-loop control circuit being compared with a desired value and the valves assigned to the corresponding closed-loop control circuit and the at least one valve arranged in the region of the secondary supply line being able to be actuated.

In one embodiment of the invention, the closed-loop controller is in the form of a P closed-loop controller or a PI closed-loop controller.

In one preferred embodiment of the invention, the closed-loop controller is in the form of a PID closed-loop controller.

In one particularly preferred embodiment of the invention, it has at least two closed-loop controllers, at least one first closed-loop controller of which controls the fluid supply to the closed-loop control circuits in a closed-loop manner via the respective primary line(s) and at least one further closed-loop controller of which controls the fluid supply to the closed-loop control circuits in a closed-loop manner via the secondary supply line and the respective secondary line(s).

In one embodiment of the invention, the at least one first closed-loop controller is in the form of a P closed-loop controller and the at least one further closed-loop controller is in the form of a PID closed-loop controller which can be sequentially connected in one particularly preferred embodiment according to the invention.

In one embodiment of the invention, at least one primary line and/or at least one secondary line and/or at least one secondary supply line and/or at least one supply device for a fluid and/or at least one closed-loop control circuit is/are part of the device according to the invention.

According to one embodiment according to the invention of a valve control device, a metal block is used as a central component and is provided with main and additional channels, wherein the additional channels open into the main channels according to the description above.

The block may be produced, for example, from steel, in particular stainless steel, or aluminum. Production from stainless steel is preferred, in particular, since the problem of cavitation occurs in practice, which results in metal parts in the channels being worn away. Stainless steel, for example made of austenite, proves to be particularly resistant here.

A heating press according to the invention has at least one valve control device according to the invention in one of the embodiments described above. The closed-loop control circuits are preferably in the form of heating circuits in this case and the fluid is in the form of a heat-conducting fluid.

A valve control method according to the invention comprises at least the following steps in one embodiment variant:
1. Actuation of the valves arranged in the region of the primary lines ("open" or "closed")
2. Reading of the sensor measured values from the sensors assigned to the closed-loop control circuits
3. Comparison of the sensor measured values (actual values) with the desired values assigned to the closed-loop control circuits
4. Actuation of the valves arranged in the secondary lines, with the result that at least one valve in the region of at least one secondary line is open
5. Actuation of the at least one valve arranged in the region of the secondary supply line in order to adjust the volumetric flow in the secondary supply line.

In one advantageous embodiment variant, a valve control method according to the invention additionally comprises the step of determining the closed-loop control circuit with the greatest difference between the actual value and the desired value, wherein the valves arranged in the secondary lines are actuated according to step 5 in such a manner that only the at least one valve in the secondary line assigned to the closed-loop control circuit with the greatest difference is open.

In one embodiment variant according to the invention of the method for controlling valves, valves are arranged in the region of lines for a fluid, wherein the fluid is supplied to an assigned closed-loop control circuit through at least one primary line in each case and a closed-loop control variable of the closed-loop control circuit is influenced thereby. In a method step, the available values of the closed-loop control variable in the respective closed-loop control circuit are captured with the aid of a sensor, and the difference between the actual value of the closed-loop control variable and a desired value is determined in a further method step. The control of the valves assigned to a closed-loop control circuit is controlled in a closed-loop manner on the basis of the closed-loop control variable and the valves are actuated with the aid of a control unit, with the result that the fluid flows through the lines in which the respective valves are arranged according to the valve states. Furthermore, two valves in the form of switching valves are respectively arranged in a primary line and at least one closed-loop control valve is arranged in at least one secondary supply line and at least one valve in the form of a switching valve is respectively arranged in a respective secondary line branching off from the secondary supply line. In a respective method step, the valves arranged in the primary lines are actuated in the sense that they are opened or closed, and at least one of the valves arranged in a secondary line is opened in a further method step. In a further method step, the closed-loop control valve is actuated in order to adjust the volumetric flow of the fluid flowing through the secondary supply line, with the result that the volumetric flow of the fluid through the secondary supply line is added to the volumetric flow of the fluid through at least one primary line for at least one closed-loop control circuit.

In one preferred variant, the valve control method according to the invention uses a valve control device according to the invention.

In one preferred variant, the valve control method according to the invention is used in the region of a tire heating press.

However, a use of the device according to the invention and/or of the method according to the invention in other areas of installation construction, for individual machines or in the field of temperature-controlled process engineering, for example in extruders, is also intended.

A valve control method according to the invention and a valve control device according to the invention enable improved accuracy and speed of the closed-loop temperature control of a plurality of heating circuits, in particular when at least one closed-loop control valve is used in the region of the at least one secondary supply line.

In comparison with the use of at least one closed-loop control valve for a respective heating circuit, the manufacturing costs are also reduced.

BRIEF DESCRIPTION OF THE DRAWING

Exemplary embodiments of the invention are schematically illustrated in the drawings, in which.

DETAILED DESCRIPTION OF THE INVENTION

Figure 1:
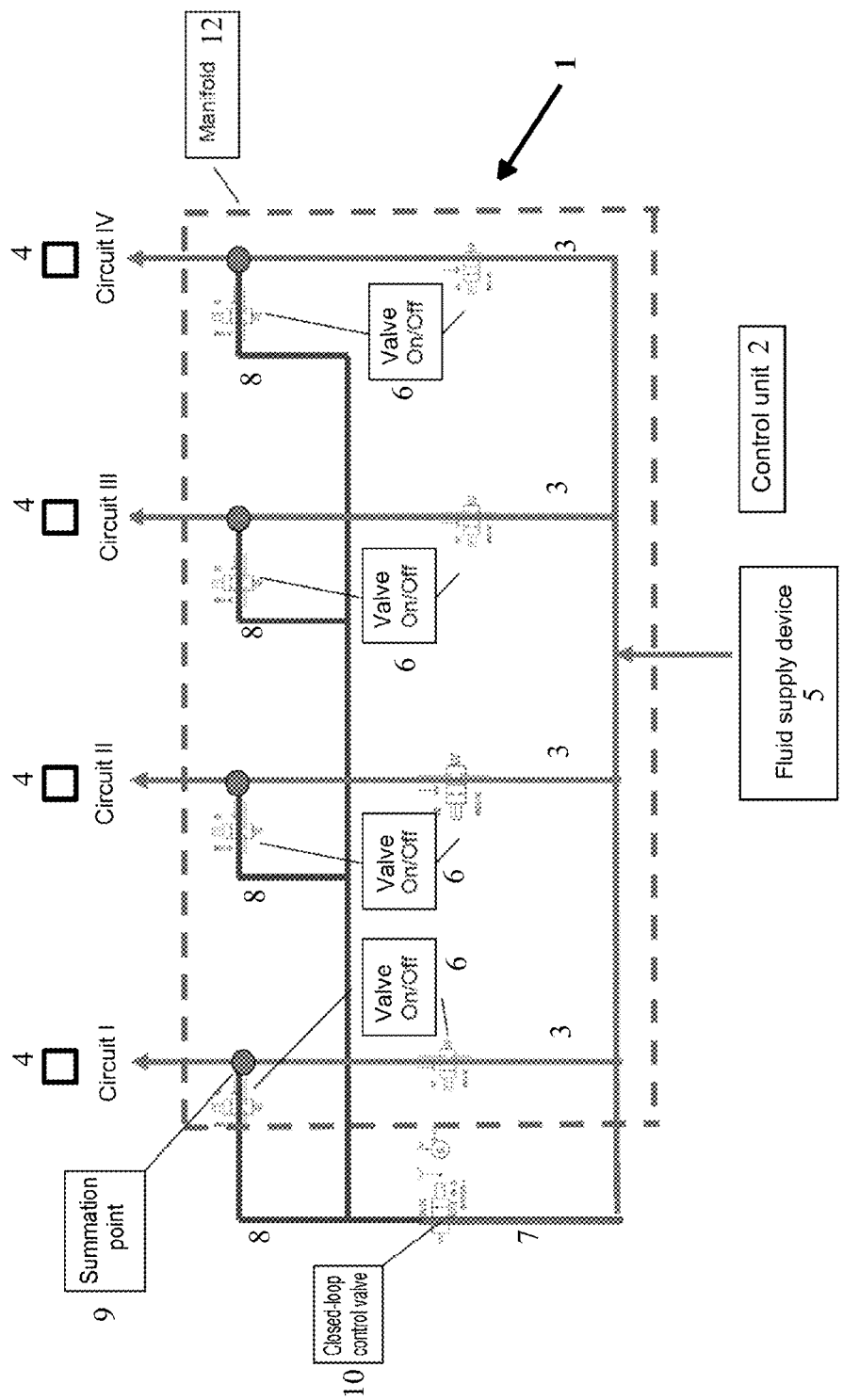
FIG. 1 shows a simplified circuit diagram for using a closed-loop control valve and a plurality of switching valves.

FIG. 1 schematically illustrates a circuit diagram of a valve control device (1) according to the invention. The valve control device (1) has a central control unit (2). The valve control device (1) also has four primary lines (3). In this case, one primary line (3) in each case connects an assigned closed-loop control circuit (4) to a central supply device for a fluid (5).

A valve (6) in the form of a switching valve is respectively arranged in the region of the primary lines (3) and should be opened and closed with the aid of the control unit (2). If the respective valve (6) is open, the fluid flows through the respective primary line (3) into the respective closed-loop control circuit (4).

In addition to the primary lines (3), a secondary supply line (7) branches off from the central supply device of a fluid (5) and branches into four secondary lines (8). Each of the secondary lines (8) opens into a respective primary line (3) at a summation point (9). A secondary line (8) is therefore assigned to each of the closed-loop control circuits (4).

A valve (6) in the form of a switching valve is respectively arranged in the region of the secondary lines (8). Each of the valves (6) arranged in the region of the secondary lines (8) can be individually actuated with the aid of the control unit (2), with the result that said valves should be opened and closed.

A valve (6) in the form of a closed-loop control valve (10) is arranged in the region of the secondary supply line (7). The closed-loop control valve (10) can be actuated with the aid of the control unit (2), with the result that the volumetric flow of the fluid through the secondary supply line (7) can be adjusted in a range between the volumetric flow present when a closed-loop control valve (10) is completely closed and the volumetric flow present when a closed-loop control valve (10) is completely open.

A defined additional volumetric flow of the fluid can therefore be initiated in each of the primary lines (3) at the summation point (9) by actuating the valves (6) in the secondary lines (8) and the closed-loop control valve (10) in the secondary supply line (7).

At least one sensor (11) is arranged in the region of the closed-loop control circuits (4) in a manner assigned to each closed-loop control circuit (4) and can be used to directly or indirectly capture the closed-loop control variable present in the region of the closed-loop control circuit (4).

The measured values captured with the aid of the sensors (11) can be evaluated with the aid of the control unit (2), with the result that the closed-loop control circuits are controlled in a closed-loop manner with the aid of the control unit (2) by actuating the valves (6, 10).

The main channels (3) and the additional channels (8) are integrated in a block (12) produced from stainless steel, for example.

Figure 2:
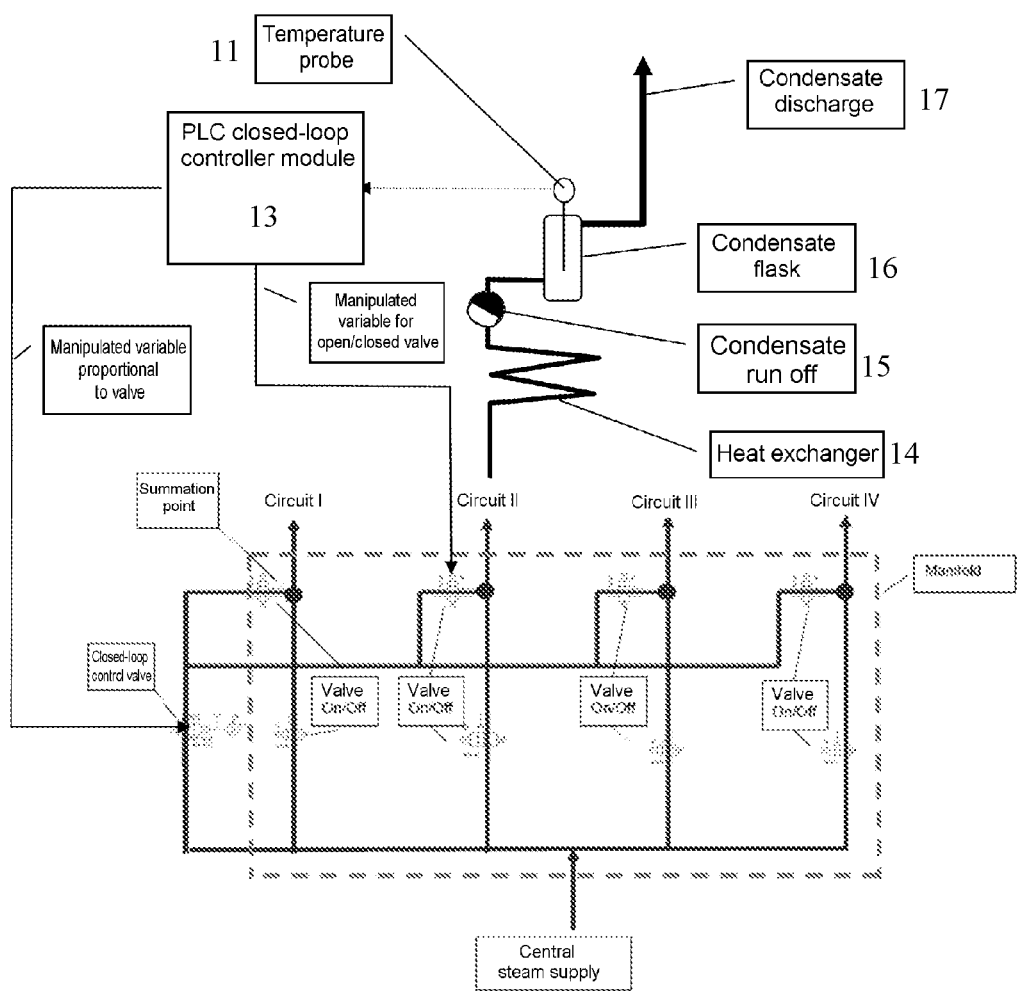
FIG. 2 shows a circuit diagram according to FIG. 1 with additional details relating to the control unit/the closed-loop controllers of the device.

In addition to FIG. 1, FIG. 2 shows the structure and the functional relationship of elements of the control unit (2) using the example of a valve control device (1) designed to control the temperature of heating circuits in a closed-loop manner.

The control unit (2) has a closed-loop controller (13), for example in the form of a PLC closed-loop controller module.

A heat exchanger (14) is respectively arranged in the region of the closed-loop control circuits (4) which are in the form of heating circuits. The condensate is discharged to a condensate container (16) in the form of a condensate flask via a condensate run-off (15). The condensate discharge (17) leads away from the condensate container (16).

The temperature of the condensate can be captured in the region of a condensate container (16) with the aid of a respective temperature sensor (11) or temperature probe.

The temperature measured values from the temperature sensors (11) can be read with the aid of the control unit (2) and can be transmitted to the closed-loop controller (13).

An explanation of the principles according to the invention is given below using the example of an application for tire heating presses. As a result, inexpensive multiplex closed-loop control of the temperature in a plurality of heating circuits is provided according to the invention.

Various heating circuits are required for the external heating of the tire heating press. Depending on the customer requirement or in order to reduce the risks to the installation manufacturer, 2 to 8 closed-loop control circuits are used for each press. The closed-loop control circuits for each cavity in detail are by way of example:
1. Heating plate "at the top"
2. Heating plate "at the bottom"
3. Mold
4. Lower mold shell
5. Special solutions for further heating circuits.

The individual heating circuits are supplied with the heat-conducting fluid via the main channels and thus heat the respective component/assembly of the heating press.

The temperature of the heating circuits is captured with the aid of temperature sensors and is compared with the respective desired value by the control unit. The basic closed-loop control of the heating circuit temperatures is carried out, with the aid of a P or PI closed-loop control system implemented with the closed-loop controller, by opening and closing the valves in the main channels.

An additional closed-loop control system can be connected to this basic closed-loop control system via the additional channels. In one embodiment of the invention, this additional closed-loop control system is provided by a PID closed-loop control system which is implemented with the closed-loop controller and specifies the actuation of a closed-loop control valve in order to control the volumetric flow of the heat-conducting fluid in the secondary supply line.

In one embodiment of the invention, the heating circuit with the greatest difference between the desired value and the actual value is respectively determined and is approximated by connecting the additional closed-loop control system.

As a result, a PID closed-loop control system is superimposed on the basic closed-loop control system ("on/off" closed-loop control) in a respective heating circuit.

In this case, use is made of PID closed-loop controllers whose requirement for precise closed-loop control is guaranteed. However, the invention also considers meeting the objective of sufficiently accurate closed-loop control with concessions with the aid of a PI or P closed-loop controller. The fundamental character of the slow closed-loop press control is the delay time caused by the large mass of the body and the temperature to be controlled in a closed-loop manner.

In one exemplary embodiment of the invention, four closed-loop control circuits which operate according to the principle of "on/off" closed-loop control were created in a valve bank. Each closed-loop controller has its own software closed-loop control circuit. A subroutine in the closed-loop control program always selects the closed-loop control circuit having the greatest closed-loop control deviation. The PID closed-loop controller is connected to the selected closed-loop control circuit at the summation point in order to reduce temperature differences. This is carried out in the change of the heating circuits depending on requirements.

I claim:

1. A valve control device, comprising: a plurality of lines for a fluid, including at least two primary lines and at least one secondary supply line; a plurality of valves arranged in a region of the plurality of lines, wherein at least two of the valves are switching valves, wherein in a region of each primary line there is arranged one of the switching valves, wherein at least one of the plurality of valves is a closed-loop control valve arranged in the at least one secondary supply line, wherein the plurality of lines includes at least one branch arranged downstream of the at least one closed-loop control valve in a direction of flow, and at least two secondary lines that extend downstream of the at least one branch, wherein the plurality of valves further includes at least one switching valve in each secondary line; and a control unit that controls function of the plurality of valves, wherein the valves of the plurality of valves are connected to the control unit so as to form at least one closed-loop control circuit, wherein the valves of the plurality of valves are designed to control superheated steam, saturated steam, heat transfer fluid and/or refrigeration transfer fluid, and wherein at least one of the secondary lines is connected to one of the primary lines by a merger, wherein the arrangement of the valves of the plurality of valves and the control unit for at least one closed-loop control circuit are combined to form a combination of a P-closed-loop control system and a sequential PI or PID closed-loop control system.

2. The device according to claim 1, wherein the valves of the plurality of valves are arranged in a region of a tire heating press.

3. The device according to claim 1, wherein the at least two secondary lines act as a feed for a parallel supply of a fluid arranged downstream of the at least one closed-loop control valve.

4. The device according to claim 1, further comprising at least one assigned sensor for each closed-loop control circuit.

5. The device according to claim 4, wherein the at least one sensor is a temperature sensor.

6. The device according to claim 1, wherein the control unit includes a closed-loop controller for implementing a P and/or PI and/or PID closed-loop control system for controlling states of the valves of the plurality of valves.

7. A heating press for vulcanizing tires, comprising: at least two assemblies; and a valve control device according to claim 1 arranged to control heating of the at least two assemblies.

8. A method for controlling valves, wherein the valves are arranged in a region of lines for a fluid, wherein the fluid is supplied to a respective closed-loop control circuit through at least one primary line in each case and influences a closed-loop control variable of the respective closed-loop control circuit, the method comprising the steps of: directly or indirectly capturing actual values of the closed-loop control variable in the respective closed-loop control circuit using a sensor; determining a difference between the actual value of the closed-loop control variable and a desired value; controlling valves assigned to the respective closed-loop control circuit in a closed-loop manner based on the closed-loop control variable by actuating the valves assigned to the respective closed-loop control circuit with a control unit so that the fluid flows through lines in which the valves are arranged according to valve states, wherein at least two switching valves are respectively arranged in primary lines and at least one closed-loop control valve is arranged in at one secondary supply line and a switching valve is respectively arranged in each of at least two secondary lines branching off from the at least one secondary supply line, wherein actuating the valves with the control unit includes actuating the at least two switching valves arranged in the primary lines to be opened or closed; opening at least one of the switching valves arranged in the secondary lines; and actuating the at least one closed-loop control valve in a further step to adjust volumetric flow of the fluid flowing through the at least one secondary supply line so that the volumetric flow of the fluid through the at least one secondary supply line is added to volumetric flow of the fluid through at least one primary line for at least one closed-loop control circuit.

9. The method according to claim 8, wherein the at least one closed-loop control circuit includes at least two closed-loop control circuits, wherein the switching valves in the secondary lines are assigned to respective of the closed-loop control circuits, the method including determining which of the at least two closed-loop control circuits has a greatest difference between the desired value and the actual value, and subsequently opening only the switching valve assigned to the determined closed-loop control circuit.

10. The method according to claim 8, including actuating valve states of the at least two switching valves arranged in the primary lines using a P closed-loop control system, and actuating a valve state of the at least one closed-loop control valve arranged in the at least one secondary supply line using a PI or a PID closed-loop control system.

11. The method according to claim 8, wherein the at least one closed-loop control circuit includes at least two closed-loop control circuits, the method including carrying out closed-loop temperature control of the at least two closed-loop control circuits.

* * * * *